United States Patent Office 3,301,630
Patented Jan. 31, 1967

3,301,630
FLUOROAZO DYE TREATED ARTICLES
Ernest M. May, Summit, and Andrew Fono, Montclair, N.J., assignors to Otto B. May, Inc., Newark, N.J., a corporation of New Jersey
No Drawing. Original application June 6, 1962, Ser. No. 200,304, now Patent No. 3,238,189. Divided and this application Apr. 5, 1965, Ser. No. 450,569
19 Claims. (Cl. 8—41)

This is a divisional application of Serial No. 200,304, filed June 6, 1962, now Patent No. 3,238,189.

This invention relates to new dyes; and, more particularly, it is concerned with compounds which are especially suitable for dyeing shaped articles of polypropylene and other thermoplastic resins, such as polyesters, polyacrylics, polyamides and other polyolefins.

In the past, substituted arylazosalicylic acid compounds have been applied to shaped articles, such as synthetic fibers, in an attempt to dye these articles in a commercially satisfactory way, that is to say, to yield a dyed produce which is fast to light, washing and dry cleaning. However, these compounds have not been entirely suitable since the articles dyed therefrom have had a relative poor fastness to light, i.e., light fastness properties less than 40 hours in a fadeometer.

An object of the present invention is to obtain dye compositions which are suitable for dyeing polypropylene and other polyolefins to provide an end product with superior light fastness.

Another object of the invention is to obtain dyes which can be used for dyeing other thermoplastic resins, such as polyesters, polyacrylics, and polyamides to form a dyed article having excellent fastness to light.

It is common practice in the textile industry to form composite fabrics containing two or more types of fibers. For example, the composite fabric may be woven of threads containing, in a predetermined pattern, threads of polypropylene, nylon, and/or other fibers, such as polyacrylics, natural fibers, etc. With respect to these composite fabrics, there is an immediate problem of finding a dye which will give a "union" dyeing. This is a problem and a term which is well-known in the art.

Accordingly, another object of this invention is to produce dyes which will dye simultaneously and satisfactorily mixed fabrics composed of more than one synthetic and/or wool and silk fibers.

A further object of the present invention is to provide dyes which are fast to washing and severe dry cleaning when applied to shaped articles, particularly fibers containing finely dispersed metallic compounds; more specifically to provide dyes which have extraordinary light fastness properties, for example, 160 hours in the fadeometer.

One of the very difficult problems that has confronted the industry is stabilizing polypropylene and other polyolefin fibers against ageing, that is, degradation caused by exposure to air, light, and/or heat. Many types of known stabilizers have been incorporated into the fibers to impart some degree of stability thereto. However, these stabilizers generally are removed by washing and/or dry cleaning with various solvents, and the fibers lose most or all of their resistance to ageing.

Accordingly, still another object of this invention, is to stabilize shaped articles formed from polypropylene and other polyolefins and preferably simultaneously stabilize and pigment such materials.

Another object is to improve stability and the resistance of these polymers to ageing, particularly after they have been washed, dry cleaned or exposed to other solvents.

Other objects and advantages of the present invention will appear from the following description.

According to the present invention, it has been found that the fluorine atom either directly connected to the aryl nucleus of arylazosalicylic or cresotinic acid or connected in the form of a trifluoromethyl to the aryl nucleus confers extraordinary light stability to these compounds when they are dyed on thermoplastic shaped articles of polyolefins, particularly polypropylene containing a metal; polyamides; and polyacrylics. These substituted arylazosalicylic acid compounds are described by the following structural formula:

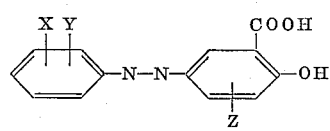

wherein X is a substituent group attached to the benzene nucleus selected from the group consisting of fluorine and trifluoromethyl; Y is a substituent group attached to the benzene nucleus selected from the group consisting of fluorine, trifluoromethyl, hydrogen, chlorine, bromine and methyl; and Z is selected from the group consisting of hydrogen and methyl.

The desirable properties of the compounds described above are realized by reacting them with a metallic compound of aluminum or zinc. The reaction product is generally formed in the shaped articles, such as fibers of polypropylene and other polyolefins, by incorporating initially a metal compound of aluminum or zinc into the polyolefin. This procedure will be described more completely hereafter.

The precise nature and structure of the aforementioned reaction product is not clearly understood. However, it is though that a chelate ring or linkage may be formed between the metallic cation and the adjacent carboxylic and hydroxyl groups on the salicyclic acid ring, and this may be responsible for the desirable properties of the formed reaction product. Furthermore, there is no precise stoichiometric ratio between the dye and the metallic compound. This is believed to be due to any one or more of a number of factors. In the first place, the metallic compound may not penetrate into all of the interstices of the dye or vice-versa; and, therefore, the reaction may not be complete. In the second place, aluminum and zinc are known to exist in the form of polymers or oligomers; and, therefore, a single dye molecule may account for more than one atom of the metal. The amount of dye used may be sufficient to account for all of the metal present; however, this is not an absolute requirement. For instance, in dyeing shaped articles, such as fibers, it may not be necessary to provide enough dye to react with all of the metal which is finely divided and uniformly distributed throughout the mass. Furthermore, the ratio of fiber to metal is not a critical feature of the invention and a suitable ratio may be readily determined from a given set of circumstances and the desired objectives.

A particular striking feature of this invention is the stabilizing effect of the substituted arylazosalicyclic acid dye on the polypropylene or other polyolefin shaped article, such as a fiber. As stated heretofore, stabilizing such materials has been a very difficult problem, particularly since laundering, dry cleaning or exposure to other solvents tend to remove known stabilizers. It has been surprisingly found in accordance with the present invention that the substituted arylazosalicyclic acid compounds described above impart stability to the polypropylene or other polyolefin and resist removal by laundering, dry cleaning, etc.

The aforementioned arylazo dyes can be prepared by any known method. However, they are generally formed by coupling a subsituted aniline through diazotization with salicyclic acid.

In one embodiment, a shaped article, for example, a synthetic fiber, has a metal incorporated therein before a substituted salicyclic arylazo dye is applied. The synthetic fibers or other shaped article applicable to this invention include polyolefins, polyesters, for example, condensation products of polybasic acids with polyhydric alcohols and Dacron; polyamides, such as nylon; polymers of acrylic acid compounds, such as, acrylonitrile; and polymers of vinyl compounds, such as, vinyl alcohol, vinyl chloride and styrene. A polyolefin, which is the preferred polymer for a synthetic fiber, includes the following polymers among others: polyethylene, polypropylene, polybutene, poly-3-methylbutene-1, polypentene, poly-4-methyl-pentene-1, and polyheptene. The polyolefin, e.g., polypropylene, can be prepared by any known method. A suitable, but not the only method, is disclosed in Belgian Patent 533,363, which is incorporated herein by reference.

Synthetic shaped articles are formed from the aforementioned thermoplastic polymers in accordance with known prior art procedures. A fiber, which is preferred, is defined herein as any fibrous unit, e.g., filament yarns, rovings, mats, staple yarns, sheets, rods, plates, woven fabrics and chopped fibers. The following exemplify specific commercial fibers which can be employed herein: spun Dacron T–54, nylon filament thread, Cresland T–58; Acrilan 1656; and polypropylene 805 fiber.

Although synthetic fibers are usually employed, the metallic reaction product embodiment is also applicable to natural fibers, e.g., wool, animalized cotton and silk. Furthermore, it is also possible to use a combination of any two or more synthetic or natural fibers to form a composite fabric. Union dyeing is provided on the composite fabric by using the arylazo dyes described herein.

The metal, which is incorporated into the fiber, forms a reaction product with the subsequently applied dye composition. Aluminum and zinc are the preferred metals, and they are utilized as metallic compounds. Organic metal salts which are preferred, may be employed within the range of .02 to .2% based upon the weight of the fiber. Carboxylic acid metal salts with 6 to 20 carbon atoms, which are suitable for this invention include aluminum stearate, zinc stearate, aluminum laurate, and the aluminum salt of 2-ethyl hexanoic acid. These salts are intimately dispersed throughout the polymer at any stage prior to its extrusion. An efficient blending apparatus is usually adequate to accomplish this result. After dispersion the blend may be extruded at the fluid temperature for the polymer, i.e., 250 to 350° C. for polypropylene. Accordingly, the metal is usually distributed uniformly throughout the fiber, e.g., polyolefin fiber, which provides complete penetration of the dye from the dye bath into the fibers. By way of illustration, the incorporation of the metal salt in the polymer may be made by mixing 10 parts of the powder of the salt with 90 parts of the powder of the polymer to an intimate and uniformly dispersed mixture. This mixture may be extruded to form a concentrate which subsequently is finely divided again and intimately blended with additional polymer to obtain the desired low concentration of metal for extrusion to the shaped product.

The substituted salicylic dyes heretofore described form the basis of an aqueous dye bath into which the fibers are immersed. Since the dyes are insoluble in water, they are dispersed or emulsified in the bath. The concentration of the dye bath can vary over a wide range, depending upon the depth of shade desired. Any known dyeing technique can be employed in this invention. For example, a skein can be simply immersed into the bath at its approximate boiling temperature; or a finished piece can be dyed by using a jigger. The dye bath can be slightly acidic and the fiber is usually rinsed and dried subsequent to its immersion in the dye bath. Known pressure dyeing techniques which accelerate the entry of the dye into the fiber may also be used.

In another embodiment of the present invention, the fiber, i.e., a synthetic or natural fiber, is not modified with a metallic material. This unmodified fiber is immersed directly into a dye bath and subsequently rinsed and dried. These steps can be accomplished by any procedure known in the art and can be similar to the procedures described for the above embodiment. For example, the aqueous dye bath suspension can contain a sulfonated oil, soap, sodium lignin sulfonate, or other suitable dispersing agent. Although direct dyeing operations are generally performed at temperatures of about 160° to 212° F., any suitable temperature can be used, including pressure dyeing and thermofixation techniques. The fiber to be dyed is usually added to the dye bath initially at a relatively low temperature and then a higher temperature is provided for carrying out the actual dyeing operation. The intensity of dyeing is varied by changing the proportion of the weight of dye to the weight of the fiber.

Thus, in accordance with the instant invention, fluoro arylazosalicylic acid compounds have been provided which are suitable dyestuffs. Furthermore, these compounds will react with metal-modified shaped articles to form a dyed end product which has excellent fastness to light and which is also fast to dry cleaning and washing. Similarly, these compounds can be applied directly to dye an unmodified fiber since, for example, nylon, polyester, and acrylic fibers have polar groups which can form a polar linkage with the present dyes to improve the receptivity of the dye and the fastness properties, such as light fastness of the dye on the fibers.

The following examples are submitted to illustrate but not to limit this invention. Unless otherwise indicated, all parts and percentages in the specification are based upon weight.

EXAMPLE I

A 2-trifluoromethylbenzeneazosalicylic acid dyestuff was provided by dissolving 16.1 parts (.1 mol) orthotrifluoromethyl aniline in 300 parts of water containing 34.2 parts of 32% hydrochloric acid (.3 mol). This first solution was cooled to 5° C. and 6.9 parts (.1 mol) of sodium nitrite dissolved in 50 parts water was added thereto in less than one minute. After one half hour additional reaction time, this diazo first solution was clarified.

A separate second solution was prepared from 13.8 parts (.1 mol) salicylic acid and 300 parts water containing 31.8 parts (.3 mol) sodium carbonate. This second solution was cooled to a temperature of 10° C. and over a period of two hours to the cooled second solution was added the diazo first solution. After an additional reaction time of two hours, the reaction product therefrom was filtered. The resulting filter cake was subsequently dissolved in 2000 parts boiling water, filtered hot and acidified to precipitate the dyestuff. After filtering and washing salt free with cold water, the dyestuff was dispersed to a 10% paste.

Each of the dye compounds indicated in Table I was prepared by a similar procedure with the reactants being varied to form the desired end product.

Table I

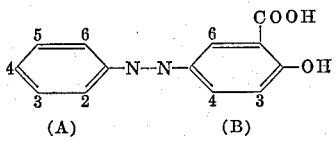

| Dye No. | A-Ring Substituents | B-Ring Substituents |
|---|---|---|
| 1 | 2-$CF_3$ | |
| 2 | 2-$CF_3$ | 3-$CH_3$ |
| 3 | 4-$CF_3$ | |
| 4 | 3-$CF_3$ | |
| 5 | 3-$CF_3$ | 3-$CH_3$ |
| 6 | 3-$CF_3$; 6-F | |
| 7 | 3-$CF_3$; 6-Cl | |
| 8 | 4-F | |

Fiber grade polypropylene, which was blended intimately and uniformly with 0.080 wt. percent of aluminum monostearate, was used to manufacture 4½ denier crimped stable fiber by melt extruding, stretching, crimping and cutting to a 2 in. length. This cut fiber was subsequently carded and spun to produce yarns approximating .10s single (cotton system) count. Convenient sized skeins were then reeled from this yarn.

Samples containing ten grams of skein were provided. Each of these samples was immersed in a 500 cc. dye bath at 120° F. The bath consists of an aqueous dispersion of 0.6 gram of the dry dyestuffs indicated in Table I. Prior to the entry of the yarn, sufficient acetic acid was added to the dye bath to provide a pH of 6.0. The dyeing was accomplished by gradually raising the temperature of the dye bath to its boiling point during a 30 minute period. The skein was frequently turned with a glass stirring rod and the temperature was maintained at 212° F. for a period of one hour. The yarn was then removed from the dye bath and thoroughly rinsed in running water at 160° F. The skein was subsequently scoured by turning it for 30 minutes at 160° F. in a 400 cc. aqueous bath containing ½% of Triton X-100 (iso-octyl-phenyl polyethoxy ethanol) and ½% of sodium carbonate. A thorough rinse was subsequently performed in running water at 110° F.

Nylon was dyed in accordance with the following procedure. The above dye compound was added to 300 parts of water with the pH being adjusted to 4–5. A 10 gram skein was added thereto, and the bath was brought to boil for 1 hour. The skein was subsequently rinsed.

A Dacron fiber or an acrylic fiber was dyed by providing a bath at 180° F. containing 200 parts water and 1.5 parts of a blend of 67% biphenyl and 33% anionic emulsifier. Ten grams of skein were incorporated for a five to ten minute run. The dye, which had been previously pasted and dispersed in 100 parts water, was added and the temperature of the bath was raised to boil for 1 to 1½ hours. The following procedures were subsequently employed: rinsing for 5 minutes in a fresh bath heated as rapidly as possible to 190 to 200° F.; dropping without cooling; and scouring at 200° F. for 15 to 20 minutes.

The dyed samples were then subjected to the following tests.

(1) *Color fastness to dry cleaning.*—Tentative Test Method 85–1960 (1960 Technical Manual of the American Association of Textile Chemists and Colorists, pages 88–9) amended as follows: the temperature shall be 115° F.; the time shall be 1 hour; and the amount of perchloroethylene shall be 200 cc.

(2) *Color fastness to washing (polypropylene).*—Tentative Test Method 61–1960, test number III–A (1960 Technical Manual of the American Association of Textile Chemists and Colorists, pages 93–4). In each instance, the dyeings shall rate (for polypropylene) as follows: for color loss, class 5; for staining, class 3 or better.

(3) *Color fastness for washing (synthetics).*—AATCC tentative test method 61–1961 T (page 105 loc. cit.) with Test III–A being used for polyester and after-chromed nylon and Test II–A for nylon.

(4) *Color fastness to light.*—AATCC Standard Test Method 16–A, 1960 (page 90 loc. cit.).

(5) *Color fastness to oxides of nitrogen in the atmosphere (gas fading).*—Three cycles were used of Standard Test Method 23–1957 (page 98 loc. cit.) or Standard Test Method 75–1956 (page 100 loc. cit.).

(6) *Sublimation and heat fastness tests.*—Sublimation and heat fastness tests were run at 265° F. for 15 minutes.

All of the compounds indicated in Table I dyed nylon, acrylics and polypropylene containing the finely dispersed metallic salts in yellow shades. The dyeings on the metallic modified polypropylene, which were 0.6% strength dry basis, showed only slight fading after 160 hours exposure to light. The neutral yellow shade of metallic-modified polypropylene with Dye No. 1 thereon also had excellent fastness to washing, dry cleaning, gas fading and sublimation and heat. Dye No. 5 gave an outstanding depth of shade on the metallic-modified polypropylene.

The dyeings on nylon and Acrilan 1656 were 1.4% strength dry basis. Dye No. 1 provided a dyed Acrilan fiber which had excellent overall fastness properties and formed a dyed nylon product having excellent fastness to light and dry cleaning. The other dye compounds gave similar results with these fibers.

For Dacron, the best fastness properties are obtainable with fibers which are modified with metallic compounds.

EXAMPLE II

The compounds listed herebelow in Table II are considered to provide dyeings on polypropylene modified by a metallic compound which are fast to light, washing and dry cleaning. They are also considered to be useful for dyeing other thermoplastic fibers, which are unmodified or modified by a metallic compound, and they are also considered to be suitable for dyeing wool.

Table II

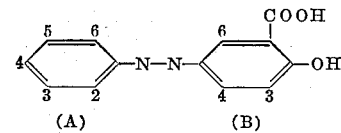

| Dye No. | A-Ring Substituents | B-Ring Substituents |
|---|---|---|
| 9 | 2-F | |
| 10 | 3-F | |
| 11 | 3-F | 4-$CH_3$ |

Having set forth the general nature and specific embodiments of the present invention, the scope is now particularly pointed out in the appended claims.

We claim:
1. A composition which comprises a metallic material reacted with a dye composition which is

2-trifluoromethylbenzeneazosalicylic acid,
2-trifluoromethylbenzeneazo-o-cresotinic acid,
4-trifluoromethylbenzeneazosalicylic acid,
3-trifluoromethyleneazosalicylic acid,
3-trifluoromethylbenzeneazo-o-cresotinic acid,
3-trifluoromethyl-6-fluorobenzeneazosalicylic acid or
3-trifluoromethyl-6-chlorobenzeneazosalicylic acid.

2. An article which comprises a shaped article dyed with a composition which is 2-trifluoromethylbenzeneazosalicylic acid,
2-trifluoromethylbenzeneazo-o-cresotinic acid,
4-trifluoromethylbenzeneazosalicylic acid, 3-trifluoromethylbenzeneazosalicylic acid,
3-trifluoromethylbenzeneazo-o-cresotinic acid,
3-trifluoromethyl-6-fluorobenzeneazosalicylic acid or
3-trifluoromethyl-6-chlorobenzeneazosalicylic acid.

3. An article which comprises a shaped article stabilized with a composition which is 2-trifluoromethylbenzeneazosalicylic acid,
2-trifluoromethylbenzeneazo-o-cresotinic acid,
4-trifluoromethylbenzeneazosalicylic acid,
3-trifluoromethylbenzeneazosalicylic acid,
3-trifluoromethylbenzeneazo-o-cresotinic acid,
3-trifluoromethyl-6-fluorobenzeneazosalicylic acid or
3-trifluoromethyl-6-chlorobenzeneazosalicylic acid.

4. An article which comprises a shaped article dyed with the reaction product formed between a metallic material and a composition which is 2-trifluoromethylbenzeneazosalicylic acid,
2-trifluoromethylbenzeneazo-o-cresotinic acid,
4-trifluoromethylbenzeneazosalicylic acid,
3-trifluoromethylbenzeneazosalicylic acid,
3-trifluoromethylbenzeneazo-o-cresotinic acid,
3-trifluoromethyl-6-fluorobenzeneazosalicylic acid or
3-trifluoromethyl-6-chlorobenzeneazosalicylic acid.

5. A process which comprises preparing a substituted arylazosalicylic acid compound which is 2-trifluoromethylbenzeneazosalicylic acid,
2-trifluoromethylbenzeneazo-o-cresotinic acid,
4-trifluoromethylbenzeneazosalicylic acid,
3-trifluoromethylbenzeneazosalicylic acid,
3-trifluoromethylbenzeneazo-o-cresotinic acid,
3-trifluoromethyl-6-fluorobenzeneazosalicylic acid or
3-trifluoromethyl-6-chlorobenzeneazosalicylic acid;

and applying said arylazo compound to a shaped article to provide a dyed shaped article having excellent fastness to light.

6. A process which comprises preparing a substituted arylazosalicylic acid compound which is 2-trifluoromethylbenzeneazosalicylic acid,
2-trifluoromethylbenzeneazo-o-cresotinic acid,
4-trifluoromethylbenzeneazosalicylic acid,
3-trifluoromethylbenzeneazosalicylic acid,
3-trifluoromethylbenzeneazo-o-cresotinic acid,
3-trifluoromethyl-6-fluorobenzeneazosalicylic acid or
3-trifluoromethyl-6-chlorobenzeneazosalicylic acid;

modifying a shaped article independently with a metallic material; and applying said arylazo compound to said modified shaped article to provide a dyed shaped article having excellent fastness to light.

7. The article according to claim 2 in which the shaped article is a fiber.

8. The article according to claim 7 in which the fiber is selected from the group consisting of a natural fiber, a synthetic fiber and a composite blend thereof.

9. The article according to claim 8 in which the natural fiber is selected from the group consisting of wool and silk.

10. The article according to claim 3 in which the shaped article is a polyolefin shaped article.

11. The article according to claim 3 in which the shaped article is a polypropylene shaped article.

12. The article according to claim 4 in which the shaped article is a polyolefin shaped article.

13. The article according to claim 4 in which the shaped article is a polypropylene shaped article.

14. The article according to claim 4 in which the metallic material is selected from the group consisting of aluminum and zinc.

15. The article according to claim 4 in which the metallic material is a carboxylic acid metal salt with 6 to 20 carbon atoms.

16. An article which comprises a polypropylene fiber dyed with the reaction product formed between aluminum monostearate and 2-trifluoromethylbenzeneazosalicylic acid.

17. An article which comprises a polyamide fiber dyed with 2-trifluoromethylbenzeneazosalicylic acid.

18. An article which comprises a polyacrylonitrile fiber dyed with 2-trifluoromethylbenzeneazosalicylic acid.

19. An article which comprises a polypropylene fiber dyed with the reaction product formed between aluminum monostearate and 3-trifluoromethylbenzeneazo-o-cresotinic acid.

No references cited.

NORMAN G. TORCHIN, *Primary Examiner.*

DONALD LEVY, *Assistant Examiner.*